INVENTOR.
CHARLES W. BLAND

June 16, 1964   C. W. BLAND   3,137,351
HYDRAULIC SPRING TOOTH HITCH

Filed Aug. 5, 1963   2 Sheets-Sheet 2

INVENTOR.
CHARLES W. BLAND
BY *Head & Johnson*
ATTORNEYS

United States Patent Office 3,137,351
Patented June 16, 1964

3,137,351
HYDRAULIC SPRING TOOTH HITCH
Charles W. Bland, P.O. Box 405, Wakita, Okla.
Filed Aug. 5, 1963, Ser. No. 299,981
11 Claims. (Cl. 172—624)

This invention relates to a hydraulic spring tooth hitch. More particularly, this invention relates to a mechanical hitch for connecting a spring tooth harrow to a draw mechanism, such as a tractor, including a remotely operable hydraulic mechanism for raising and lowering the spring teeth of the harrow.

Spring tooth harrows are commonly made and sold as independent sections, usually four feet in length. These sections are hooked together in side by side relation to make up a harrow having the desired width for the operation intended, which length is usually sixteen to twenty feet total.

Each independent section of these spring tooth harrows is provided with at least one lever that is operable to adjust the position of the spring teeth relative to the ground. Clearly when using several sections that are connected together in the manner above described all of the sections must be adjusted the same to make the total unit work evenly. Therefore, each individual section of these conventional harrows must be adjusted separately. The adjusting operation requires either an extra man or that the operator of the draw mechanism, such as a conventional farm tractor, move from the tractor to the harrow to make the necessary change and then move back to the tractor. This clearly is very time consuming and troublesome.

The harrows in common use today are usually attached behind a single transverse pull bar which in turn is connected through a series of flexible linkages, such as cables or chains, to the draw mechanism. With this type of hook-up the connecting linkages oftentimes become kinked and can become fouled in the harrow teeth, especially when executing a turn. Also, these connecting linkages are subject to structural failures resulting from repeated kinking or fouling.

Therefore, it is an object of this invention to provide a hydraulic spring tooth hitch that overcomes the disadvantages of the prior known hitches.

Another object of this invention is to provide a hydraulic spring tooth hitch that is remotely operable to vary the position of the spring teeth relative to the ground.

Still another object of this invention is to provide a hydraulic spring tooth hitch that can be operated from a point remote from the harrow to position each of the teeth uniformly relative to the ground.

A further object of this invention is to provide a hydraulic spring tooth hitch that is operable by the operator of the draw mechanism without the operator leaving the draw mechanism.

Yet another object of this invention is to provide a hydraulic spring tooth hitch that maintains all the spring teeth at the same position relative to the ground.

Still another object of this invention is to provide a hydraulic spring tooth hitch that can be easily hooked to conventional spring tooth harrows without changing or modifying the harrow.

A still further object of this invention is to provide a hydraulic spring tooth hitch that includes relatively strong rigid linkages for connecting the harrow to the draw mechanism.

Yet another object of this invention is to provide a hydraulic spring tooth hitch in which the connecting linkages are rigid and will not become fouled within the harrow spring teeth, even when executing a turn.

Yet another object of this invention is to provide a hydraulic spring tooth hitch for connecting a spring tooth harrow to the draw bars of a conventional farm tractor which utilizes the hydraulic system of the tractor to vary or control the vertical position of the spring teeth relative to the ground.

Further objects and advantages of this invention will be apparent from the following description and appended claims, reference being had to the accompanying drawings forming a part of this specification wherein like reference characters designate corresponding parts in the several views.

*General Description*

The hydraulic spring tooth hitch of this invention consists generally of an elongated pull bar extending transverse to the direction of movement of the harrow having rotatably attached thereto at least one spring tooth harrow in trailing relation thereto; a center bar rotatably attached at one end to the middle portion of the pull bar and attached at the other end of the draw bar of a conventional tractor; a sleeve reciprocally telescoped about the middle portion of the center bar; a hydraulically expansible and retractable mechanism attached at one end thereof to the sleeve and at the other end thereof to the end of the center bar that is attached to the pull bar; a least one mechanical linkage extending between the sleeve and the pull bar to cause rotation of the pull bar as the sleeve moves axially with respect to the center bar; a plurality of mechanical linkages extending between the pull bar and the spring teeth to cause rotation of the spring teeth in response to the rotation of the pull bar whereby the spring teeth will move into or out of engagement with the ground upon which the spring tooth harrow is pulled; a plurality of reinforcing support members attached at one end to the end of the center bar attached to the tractor and having at the other end a cylindrical collar for rotatably receiving therethrough the pull bar.

*Specific Description*

Figure 1:
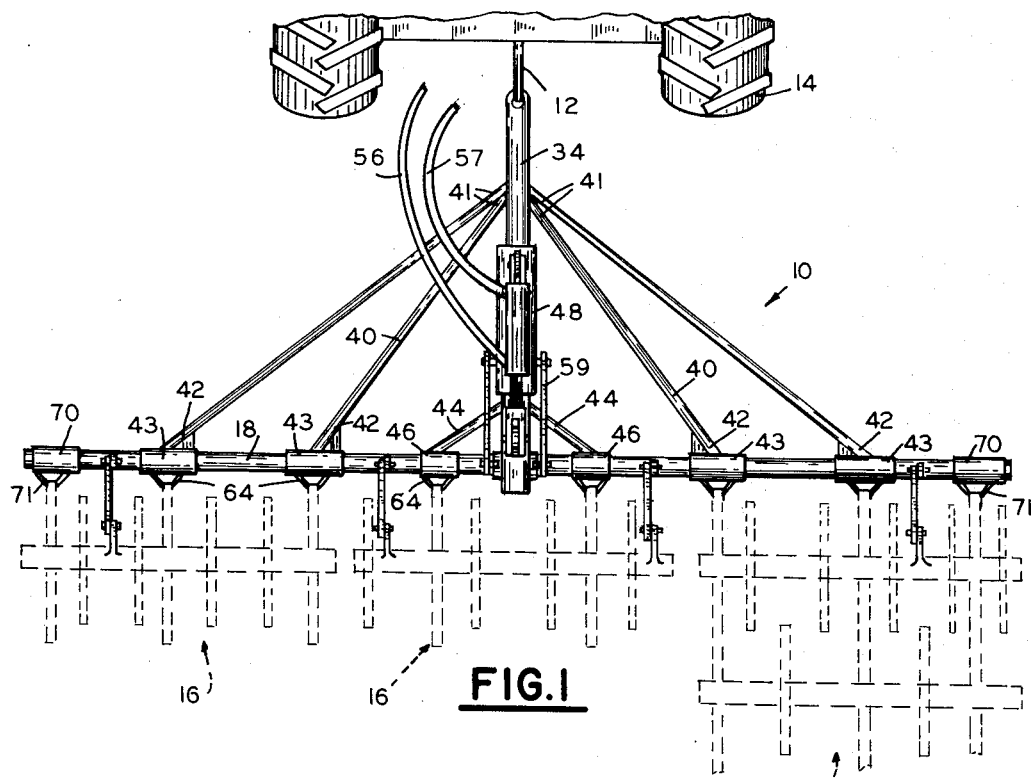
FIGURE 1 is a top plan view of the hydraulic spring tooth hitch of this invention with the teeth of the harrow in their ground engaging or plowing position.
Figure 2:
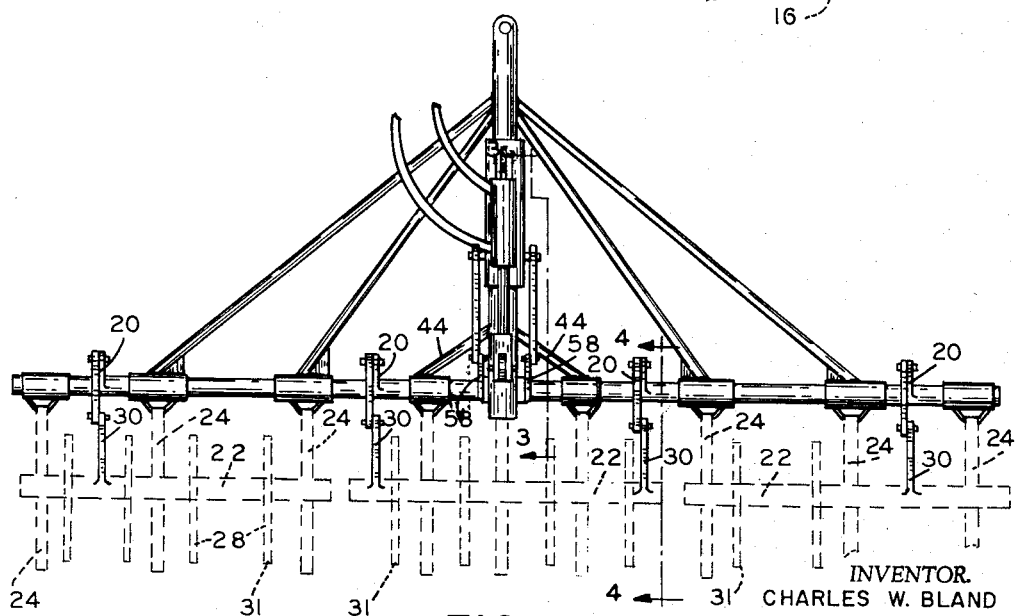
FIGURE 2 is a top plan view of the hydraulic spring tooth hitch of this invention with the teeth of the harrow withdrawn from the ground.
Figure 3:
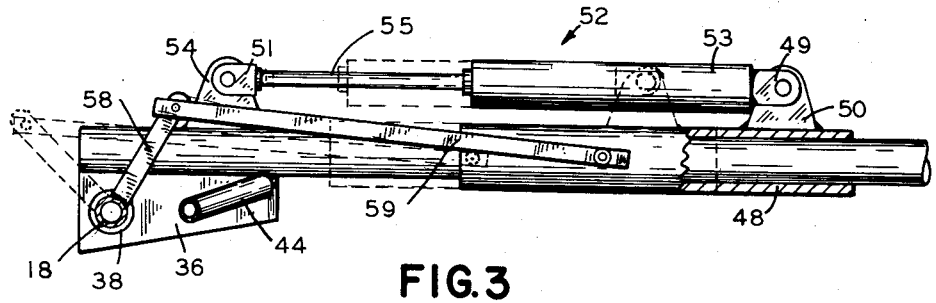
FIGURE 3 is a side elevational view of the hydraulic spring tooth hitch of FIGURE 2 taken along line 3—3.

For a more specific description of this invention reference is now made to the drawings in general and particularly to FIGURES 1 and 3. Hydraulic hitch 10 is connected at its forwardmost end to the draw bar assembly 12 of a conventional farm tractor 14 and is connected at its rearward end to one or more sections of spring tooth harrows 16.

The rearward portion of hitch 10 consists of a substantially horizontal pull bar 18 provided over its length with a plurality of upwardly directed stand-offs 20. Stand-offs 20 are relatively short arms attached to the outer periphery of the pull bar 18 by means of spot welding or similar connecting means.

Spring tooth harrows 16 are of conventional design, consisting of substantially horizontal spring tooth holder bars 22 rotatably supported upon runner members 24 by means of upwardly extending bracket-type connector members 26. Spring teeth 28 are non-rotatably attached at one end to the outside of the holder bar 22 with the teeth describing an arc about a portion of the holding bar. Upwardly extending stand-offs 30 are attached at their bottom ends to the holder bar. It has been the practice to attach an elongated upwardly extending handle (not shown) to the stand-offs 30 to be used to cause rotation of the holder bar 22 thereby causing relative rotation of the teeth 28 about the axis of bar 22 to vary the position of the cutting ends 31 of the teeth relative to the ground 33. However, the hydraulic hitch of this invention provides a much improved means for causing rotation of the holder bar 22 and tooth 28 to be more fully described hereinafter.

Connector links 32 extend between the upper end of stand-offs 20 and the upper end of stand-offs 30 thereby to transmit rotational movement of the pull bar 18 through stand-offs 20, linkages 32, and stand-offs 30 to the holder bar 22 to cause rotation of the teeth 28 into or out of engagement with the ground.

The rearward end of center bar 34 is attached at right angles to the middle portion of pull bar 18 with the center bar extending forwardly into attachment at its forwardmost end with the draw bar assembly 12 of the tractor 14. The rearward end portion of center bar 34 is provided with a depending plate 36 through which extends a cylindrical collar 38. Collar 38 receives therethrough in rotatable relation the middle portion of pull bar 18.

A plurality of bracing rods 40 are attached at their forward end to the center bar 34, near its forward end, and extend rearwardly at an acute angle to the center bar 34. Bracing rods 40 are provided on their rearward ends 42 with independent collars 43 for rotatably receiving therethrough the pull bar 18. Bracing rods 40 function to reinforce pull bar 18 to prevent pull bar 18 from becoming bent or otherwise damaged during operation and to effectively stabilize the hitch 10.

Relatively short bracing arms 44 are attached at their forward ends to the frontal portion of plate 36 and extend rearwardly therefrom at an acute angle to the pull bar 18. Their rearward ends are provided with collars 46, similar to collars 42 above described, for rotatably receiving therethrough the pull bar 18.

A sliding sleeve 48 is reciprocally received about the rearward portion of the center bar 34, between the point where bracing rods 40 attach to center bar 34 and the point where bracing arms 44 attach to center bar 34. Sleeve 48 is provided near its forwardmost end with a riser 50 for connection to one end of an expansible hydraulic mechanism 52. A second riser 54 is attached to the rearward end of center bar 34 for attachment to the other end of hydraulic mechanism 52.

Hydraulic mechanism 52 is preferably of the conventional type consisting of a hydraulic cylinder 53 with a piston rod 55 attached to a piston (not shown) reciprocally located within cylinder 53. A pressurized hydraulic fluid from a hydraulic system (not shown), preferably located on the tractor 14, is connected into cylinder 53 through hoses 56 and 57, on both sides of the piston. As is best seen in FIGURE 3, cylinder 53 is provided with a yoke-shaped bracket 49 for pivotal attachment to riser 50 and rod 55 is provided with a similar bracket 51 for pivotal attachment to riser 54.

Two actuator arms 58 are attached to the pull bar 18, on both sides of the central collar 38, and extend upwardly therefrom. Push rods 59 are pivotally attached at their rearward ends to the upper ends of the actuator arms 58 and extend forwardly into pivotal attachment at their forward ends with the sliding sleeve 48. Therefore, any rearward movement of sleeve 48 on center rod 34 will be transmitted through push rods 59, and actuator arms 58 to pull bar 18 to cause rotation of bar 18 about its axis.

It should be noted that the actuator arms 58 also function as stop members to limit the amount of axial movement that the pull bar 18 can undergo. Additional stop members (not shown) in the form of annular rings or radial extensions of various shapes can be provided on the pull bar 18, adjacent one or more of the collars 43 and 46.

In assembling the hitch of this invention the spring tooth harrows are attached to the pull bar 18 by looping the hooks 62 of runner members 24 into eyelets 64 provided in the collars 43 and 46. Additional collars 70 having eyelets 71 can be used to assist in connecting the spring tooth harrows to pull bar 18 where necessary or desirable. Connector links 32 are then pivotally attached to the upper ends of stand-offs 20 and 30 on pull bar 18 and spring tooth holder bar 22, respectively. The forward end of center bar 34 is then attached to the draw bar assembly 12 of the tractor 14, and the hydraulic hoses 56 and 57 are attached to the hydraulic system of the tractor. The apparatus is then assembled and ready for operation.

*Operation*

In the normal operation of spring tooth harrows the teeth 28 are lowered into digging contact with the ground 33 across which the harrows 16 are drawn. During operation it is sometimes desirable to change the depth of penetration of the earth by these teeth, and at times to withdraw them completely from the earth. This is easily done with the hydraulic hitch of this invention.

In lowering teeth 28 into digging contact with the ground 33 hydraulic mechanism 52 of this hitch 10 is retracted; that is, the effective length of the hydraulic mechanism is decreased by introducing hydraulic fluid through hose 56 to the rearward side of the piston (not shown) to force the piston and the piston rod 55 forwardly in cylinder 53. Since riser 54 is fixed relative to center bar 34, sleeve 48 will slide rearwardly on bar 34 as the length of hydraulic mechanism 52, between risers 50 and 54, is decreased.

The rearward movement of sleeve 48 is transmitted through push rods 59 to the upper ends of actuator arms 58, causing arms 58 to pivot in an arc about the axis of pull bar 18 thereby rotating bar 18 in a counterclockwise direction as viewed in FIGURE 3.

The rotary movement of pull bar 18 is transmitted through stand-offs 20, connector links 32 and stand-offs 30 to spring tooth holder bars 22 to cause rotation of holder bars 22 in the same direction. Counterclockwise rotation of holder bars 22, as viewed in FIGURE 4, rotates teeth 28 downwardly into digging contact with the ground 33.

Figure 4:
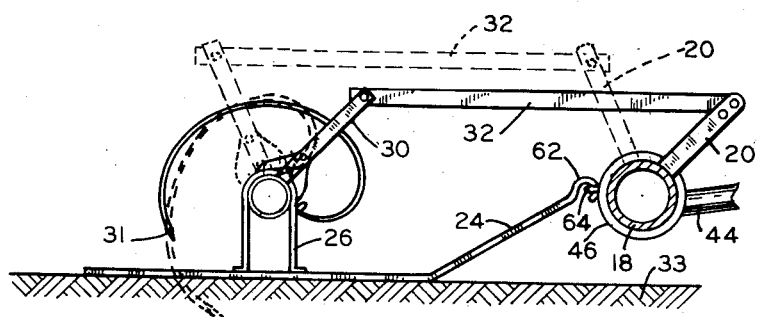
FIGURE 4 is a side elevational partial cross-sectional view of the hydraulic spring tooth hitch of FIGURE 2 taken along line 4—4.

The rearward position of these respective parts with the teeth 28 in digging contact with the ground 33, as above described, is best seen in phantom lines in FIGURES 3 and 4.

The depth of penetration of teeth 28 within ground 33 is determined by the extent to which hydraulic mechanism 52 is retracted, that is, shortened.

When it is desired to decrease the depth of penetration of the teeth 28 within ground 33 or to completely withdraw the teeth from contact with the ground, hydraulic mechanism 52 is extended, that is, lengthened, thereby reversing the above described operation to cause rotation of the teeth about spring tooth holder bar 22 in a clockwise direction, as viewed in FIGURE 4, upwardly with respect to ground 33.

It should be understood from the foregoing description that the hitch of this invention is easily operated by the operator of the draw mechanism, the farm tractor 14, to vary the vertical position of the spring teeth 28 relative to the ground 33. Furthermore, the hitch of this invention, although extremely sturdy and preferably made of metal such as cast iron or steel, is relatively lightweight and is easily connected to the draw mechanism by one man.

It should be obvious to one skilled in the art that the above described invention provides a hydraulic spring tooth harrow hitch that overcomes the disadvantages of prior known hitches.

The hitch of this invention is operable by the operator of the tractor from his position upon the tractor. Furthermore, the hitch is operable hydraulically, therefore, it is easier to operate and allows a uniform setting of the location of the spring teeth relative to the ground.

The provision of the relatively rigid bracing rods 40 results in a sturdier construction that will enjoy longer operational life.

The primary advantages obtained with the hydraulic spring tooth hitch of this invention are relative ease and simplicity of operation, uniformity of setting of all the spring teeth, and strength and stability of the hitch. Many other advantages should also be obvious to those skilled in the art.

The invention has been described by reference to specific and preferred embodiments. It will be apparent, however, that many modifications can be made without departing from the spirit and scope of the invention. But accordingly this invention should be construed not to be limited by the embodiment herein described but should be limited only by the scope of the appended claims.

What is claimed:

1. A hydraulic hitch for connecting a spring tooth harrow to a draw mechanism comprising, in combination:
   an elongated center bar attachable at its forward end to said draw mechanism, in trailing relation thereto;
   a pull bar rotatably attached at its middle to the rearward end of said center bar and perpendicular thereto;
   a cylindrical sleeve slidably received about said center bar;
   hydraulic means attached to said sleeve and to said center bar to cause longitudinal sliding movement of said sleeve on said center bar;
   a first mechanical linkage extending between said sleeve and said pull bar to convert said longitudinal movement of said sleeve into rotary movement of said pull bar; and
   a second mechanical linkage attached to said pull bar and extending rearwardly for attachment to said spring tooth harrow to actuate said harrow in response to rotation of said pull bar.

2. A hydraulic hitch for connecting a spring tooth harrow to a draw mechanism comprising, in combination:
   an elongated center bar attachable at its forward end to said draw mechanism, in trailing relation thereto;
   a pull bar rotatably attached at its middle to the rearward end of said center bar and perpendicular thereto;
   at least one bracing member extending rearwardly from attachment to said center bar at an angle to said pull bar and terminating rearwardly in a cylindrical collar that is rotatably received about said pull bar;
   a cylindrical sleeve slidably received about said center bar;
   hydraulic means attached to said sleeve and to said center bar to cause longitudinal sliding movement of said sleeve on said center bar;
   a first mechanical linkage means extending between said sleeve and said pull bar to convert said longitudinal movement of said sleeve into rotary movement of said pull bar; and
   a second mechanical linkage attached to said pull bar and extending rearwardly for attachment to said spring tooth harrow to actuate said harrow vertically in response to rotation of said pull bar.

3. A hydraulic hitch according to claim 2, wherein said first mechanical linkage consists of:
   at least one upstanding stand-off attached to said pull bar; and
   at least one push rod pivotally attached at one end to the outside of said sleeve and pivotally attached at the other end to the upper end of said stand-off.

4. A hydraulic hitch for connecting at least one spring tooth harrow to a draw mechanism, said harrow consisting of a substantially horizontal spring tooth holder bar rotatably mounted above at least one elongated support member, said holder bar having at least one spring tooth attached thereto and extending in an open arc therearound and having at least one upstanding stand-off attached thereto, said hitch comprising:
   an elongated center bar attachable at its forward end to said draw mechanism, in trailing relation thereto;
   a pull bar rotatably attached at its middle to the rearward end of said center bar and perpendicular thereto;
   at least one bracing member extending outwardly and rearwardly from attachment to said center bar and terminating rearwardly in a cylindrical collar that is rotatably received about said pull bar;
   a cylindrical sleeve slidably received about said center bar;
   an extendable hydraulic means attached at one end to said sleeve and at the other end to the said center bar to cause longitudinal sliding movement of said sleeve on said center bar;
   means to attach said spring tooth harrow in trailing relation to said pull bar;
   a first mechanical linkage means extending between said sleeve and said pull bar to convert said longitudinal movement of said sleeve into rotary movement of said pull bar; and
   a second mechanical linkage means between said pull bar and said spring tooth harrow to rotate said at least one spring tooth vertically in response to rotation of said pull bar.

5. A hydraulic hitch according to claim 4, wherein said means to attach said at least one spring tooth harrow to said pull bar consists of:
   an eyelet extending rearwardly from said cylindrical collar on the rearward end of said at least one bracing member; and
   a hook provided on the forward end of said at least one support member for receipt within said eyelet.

6. A hydraulic hitch according to claim 4, wherein said first mechanical linkage consists of:
   at least one upstanding stand-off attached to said pull bar; and
   at least one push rod pivotally attached at one end to the outside of said sleeve and pivotally attached at the other end to the upper end of said stand-off.

7. A hydraulic hitch according to claim 4, wherein said second mechanical linkage consists of:
   at least one upstanding stand-off attached to said pull bar; and
   at least one link arm pivotally attached at one end to the upper end of said at least one stand-off attached to said pull bar and pivotally attached at the other end to the upper end of said at least one upstanding stand-off attached to said spring tooth holder bar.

8. A hydraulic hitch for connecting at least one spring tooth harrow to a draw mechanism, said harrow consisting of a substantially horizontal spring tooth holder bar rotatably mounted above at least one elongated support member, said holder bar having at least one spring tooth attached thereto and extending in an open arc therearound and having at least one upstanding stand-off attached thereto, said hitch comprising:
   an elongated center bar attachable at its forward end to said draw mechanism, in trailing relation thereto;
   a plate-like extension depending from the rearward end portion of said center bar, the plane of said extension lying parallel to the axis of said center bar;
   a cylindrical collar extending perpendicularly through said extension;
   an elongated pull bar rotatably received through said collar of said extension thereby to rotatably attach the middle of said pull bar to the rearward end of said center bar;
   a plurality of bracing members extending from attachment near the forward end of said center bar outwardly and rearwardly on each side of said center bar toward said pull bar, each terminating rearwardly in a cylindrical sleeve within which said pull bar is rotatably received;

two bracing arms extending from attachment near the forward end of said extension rearwardly on each side of said extension at an acute angle to said pull bar, each arm terminating rearwardly in a cylindrical collar that is rotatably received about said pull bar;

a cylindrical sleeve longitudinally slidable about the rearward end portion of said center bar, between the forward end of said extension and the point of attachment of said plurality of bracing members to said center bar;

a first riser extending upwardly from attachment to said sleeve;

a second riser extending upwardly from attachment to the rearward end of said center bar;

a variable length hydraulic means pivotally attached at it forward end to said first riser and pivotally attached at its rearward end to said second riser;

means to attach at least one spring tooth harrow in trialing relation to said pull bar;

a first mechanical linkage means extending between said sleeve and said pull bar to convert longitudinal movement of said sleeve into rotary movement of said pull bar;

a second mechanical linkage means between said pull bar and said spring tooth harrow to rotate said at least one spring tooth vertically about said holder bar into or out of contact with the ground, in response to rotation of said pull bar; and means to supply pressure fluid to said hydraulic means to cause longitudinal sliding movement of said sleeve on said center bar.

9. A hydraulic hitch according to claim 8, wherein said means to attach said at least one spring tooth harrow to said pull bar consists of:

an eyelet extending rearwardly from said cylindrical collar on rearward end of said at least one bracing member; and a hook provided on the forward end of said at least one support member for receipt within said eyelet.

10. A hydraulic hitch according to claim 8, wherein said first mechanical linkage consists of:

a plurality of upstanding stand-offs attached to said pull bar, adjacent each end of said collar of said extension; and a plurality of push rods, each rod pivotally attached at its forward end to said sleeve and pivotally attached at its rearward end to the upper end of one of said stand-offs.

11. A hydraulic hitch according to claim 8, wherein said second mechanical linkage consists of:

at least one upstanding stand-off attached to said pull bar; and at least one link arm pivotally attached at one end to the upper end of said at least one stand-off attached to said pull bar and pivotally attached at the other end to the upper end of said at least one upstanding stand-off attached to said spring tooth holder bar.

References Cited in the file of this patent
UNITED STATES PATENTS

| | | |
|---|---|---|
| 1,932,450 | Dyn | Oct. 31, 1933 |
| 2,947,371 | Rice | Aug. 2, 1960 |